United States Patent [19]
Krivacic

[11] Patent Number: 5,621,435
[45] Date of Patent: Apr. 15, 1997

[54] COMPUTER USER INTERFACE FOR NON-DOMINANT HAND ASSISTED CONTROL

[75] Inventor: Robert T. Krivacic, San Jose, Calif.

[73] Assignee: Xerox Corporation, Stamford, Conn.

[21] Appl. No.: 379,390

[22] Filed: Jan. 27, 1995

[51] Int. Cl.$^6$ .................................................. G09G 5/08
[52] U.S. Cl. ........................ 345/145; 345/156; 345/157
[58] Field of Search .................................. 345/156, 157, 345/160, 163, 167, 168, 173, 179, 180, 182, 183, 184, 121–125, 145

[56] References Cited

U.S. PATENT DOCUMENTS 4,594,683  6/1986  Frank ........................................ 345/157
4,816,810  3/1989  Moore ....................................... 345/156

OTHER PUBLICATIONS

Bier, Eric A. and Buxton, William, "Tool Glass: Movable Transparent User Interface Widgets", Aug. 1, 1993.

Primary Examiner—Jeffery Brier
Attorney, Agent, or Firm—Fay, Sharpe, Beall, Fagan, Minnich & McKee

[57] ABSTRACT

A computer terminal user interface control is provided for allowing input from an operators non-dominant hand. Force sensitive transducers are provided at right angles to one another. Forces applied to these transducers move a tool set to various sub-portions of a video display device. The user's dominant hand is then free to select from various sub-areas of the tool window positioned by the non-dominant hand in a simple and efficient manner.

14 Claims, 4 Drawing Sheets

COMPUTER USER INTERFACE FOR NON-DOMINANT HAND ASSISTED CONTROL

BACKGROUND OF THE INVENTION

This application pertains to the art of human-machine interfaces, and more particularly to a computer terminal graphical user interface which allows for added control by an operator's non-dominant hand.

The invention is particularly applicable to computer aided design or drafting and will be described with particular reference thereto. However, it will be appreciated that the invention has broader application, such as in any computer user interface which employs a pointing device.

The dominant user interface employed today is a graphical display which works in conjunction with a hand-operated pointer. The most frequently used pointing device is a computer mouse. However, other such devices such as joysticks, digitizing pads, trackballs and the like are also widely used.

Such interfacing allows an operator to quickly position the cursor on a video display terminal ("VDT"), such as a cathode ray tube ("CRT"), liquid crystal display ("LCD"), or active or passive matrix displays.

Such graphical user interfaces ("GUIs") are regarded as highly efficient. Further, they provide an easy metaphor to allow computer operation by users who not are highly technical. An inefficiency with such devices arises when a particular action has to be taken on a particular portion of a video display. In these instances, a user must first select the particular "tool" which is desirable. After this, the user must apply the tool on the particular screen sub-area. This often requires several mouse or pointer operations. Thus, the task is rendered more complex and less efficient. Such inefficiencies are magnified for workstation usage at which an operator's performs day-long activities such as with computer aided design or drafting.

The subject invention contemplates a new and improved user interface which overcomes the above referred problems, and others, and provide a graphical user interface which is simple, efficient and easy to learn.

SUMMARY OF THE INVENTION

In accordance with the present invention, there is provide a secondary pointing device which is operated with a non-dominant hand of an operator and contemporaneously with operation of a conventional pointing device with a dominant hand.

In accordance with a more limited aspect of the present invention, there is provided a secondary pointing device which is particularly suited for operation with an operator's non-dominant hand.

In accordance with a yet more limited aspect of the present invention, the subject secondary pointing device is integrated and to an existing portion of a conventional piece of computer equipment.

An advantage of the present invention is provided with a significant enhancement in the overall speed and efficiency in implementing a graphical user interface.

Yet another advantage of the present invention is a lessening of repetitive motions required to accomplish tasks while operating a graphical user interface.

Yet another advantage of the present invention is the provision of a human/machine interface which minimizes operator fatigue, thereby resulting in even further enhanced efficiencies.

Further advantages will become apparent to one of ordinary skill in the art upon a reading and understanding of the subject specification.

BRIEF DESCRIPTION OF THE DRAWINGS

The invention may take physical form in certain parts, and arrangements of parts, preferred and alternate embodiments of which will be described in detail in the specification and illustrated in the accompanying drawings which form a part hereof, and wherein.

DETAILED DESCRIPTION OF THE PREFERRED AND ALTERNATE EMBODIMENT

Figure 1:
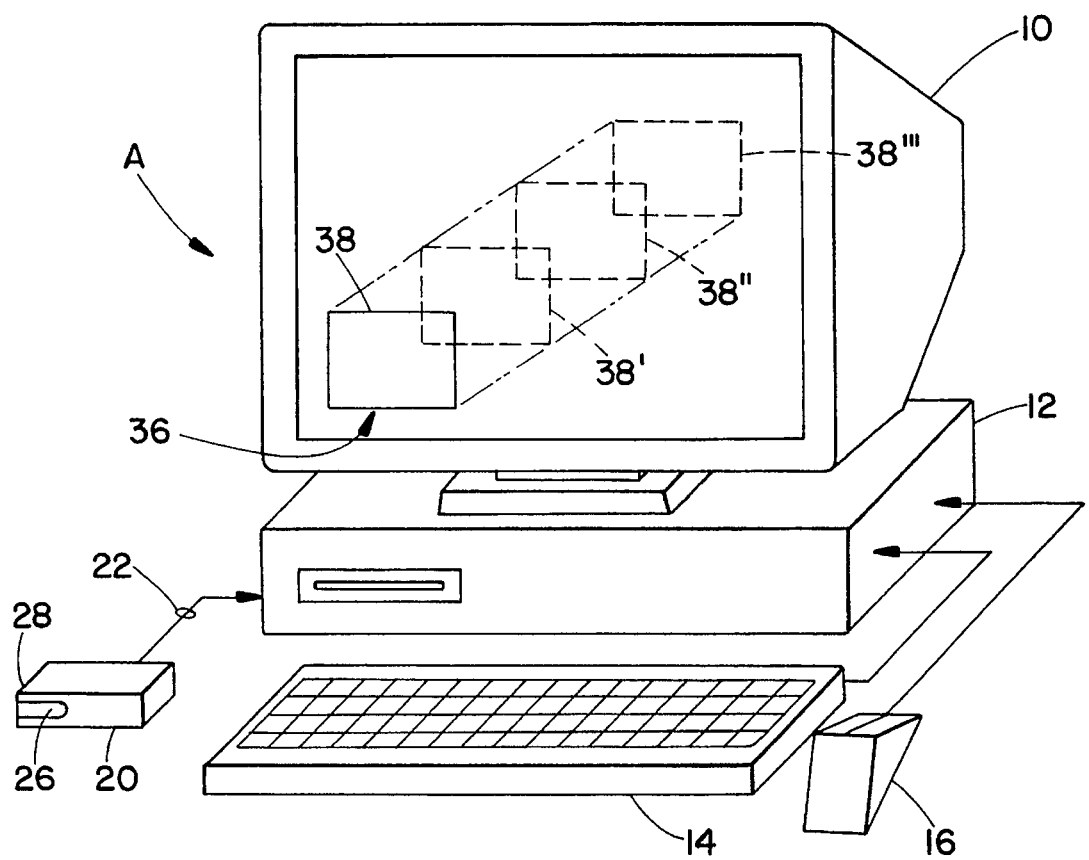
FIG. 1 illustrates a perspective view of a computer workstation employing the non-dominant hand assisted pointed device of the subject application.

Turning now to the drawings wherein the illustrations are for the purpose of illustrating the preferred and alternate embodiments of the invention only, and not for the purpose of limiting the same, FIG. 1 shows a workstation A. The workstation A includes a video display terminal ("VDT") 10 comprised of a CRT in this embodiment. The VDT is also suitably comprised of any graphical display device such as an active or passive matrix transistor display, thin film transistor ("TFT"), liquid crystal display ("LCD"), plasma display, or the like. The VDT 10 provides visual output for a CPU module 12. It will be appreciate the CPU module 12 will provide the normal, functional components associated with the workstation such as memory, processor, non-volatile storage, input/output ("IO") control, and the like.

The workstation A also includes a keyboard 14, and a conventional pointing device 16, such as a mouse. Any other pointer device may be used instead of the illustrated mouse, such as a trackball, joystick, digitizing tablet, light pen, or the like. In the embodiment of FIG. 1, a module 20 is also provided in data communication with the CPU unit 12. In the preferred embodiment, this communication is accomplished by a serial (e.g. RS232) connection 22 which is suitably a serial cable, optical link, RF link, or the like. The module 20 includes a first force sensitive area 26 disposed at generally right angle to a second force sensitive area indicated generally at 28, but not evident due to perspective. It will be appreciated that the area 28 structurally analogous to that visible at 26. The particulars of fabrication of the module 20 will be described in detail below. Functionally, pressure of a human operator's non-dominant hand on the force sensitive areas 26 or 28 causes signaling to the CPU unit 12 via a data interconnection, such as serial interconnection 22. This is then translated to a graphical user interface.

Illustrated generally at 36 of FIG. 1 is a suitable default position for a relatively large cursor or movable window.

When at no pressure is provided to the force sensitive areas 26 or 28 of the module 20, the system provides for the window 38 to be positioned automatically at the default position 36. The pressure on either of the force sensitive areas 26 or 28 causes a corresponding translation of the window 38 and the horizontal or vertical direction of VDT 10, respectively. Thus, the pressure on both force sensitive areas would result in a repositioning of the window 38 to locations 38', 38" and 38'". Subsequent release of force will result in a return of the window 38 to the default position 36. Optionally, the window may be hidden from view while it is at or returning to its default position.

Also in FIG. 1 is provided a conventional pointing device such as mouse 16. This conventional device is advantageously positioned next to a dominant hand of an operator. Although the illustration is provided a dextro-manual (right handed) user, it will be appreciated in all embodiments that relative positions of the module 20 and the mouse 16 may be readily reversed to accommodate a sinistro-manual (left handed) operator.

Figure 2:
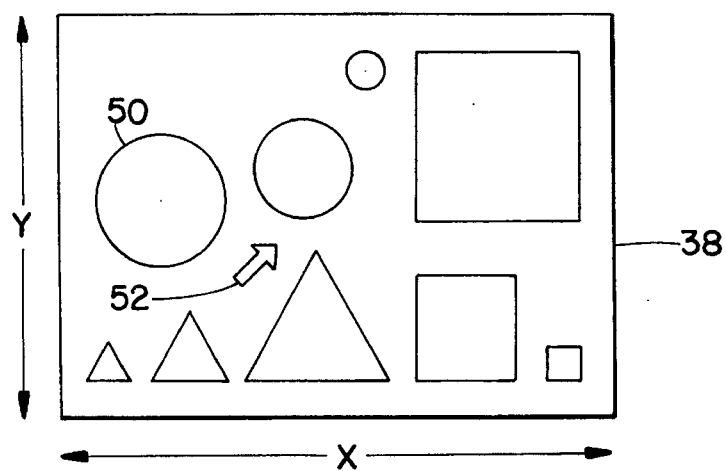
FIG. 2 illustrates an example of a sliding window display suitably used with the secondary pointing device and a cursor of a primary pointing device as described in the subject application.

Turning now to FIG. 2, an example of relative interaction between the output generated from the non-dominant hand module 20, the window 38 and the pointer 16 will be described.

illustrated in FIG. 2 is a suitable implementation of the window 38. In the example of the FIGURE, the window 38 defines a set of tools which allows a user to make use of an application. With the subject tools located on the window 38, a user may select one of a variety of "widgets" which are demonstrated with graphical primitives. With this combination, a user's eyes need never leave the VDT work area.

The window 38, which is operated or positioned by a user's weak or non-dominant hand, is responsible only for coarse positioning of the window 38. When a user has coarsely positioned, for example, a circle area 50 on a selected portion of an underlying picture, a cursor 52, associated with a dominant pointing device, may be used to select the object for finer positioning. At this point, the user may use his or her dominant hand to finally position the primitive within the underlying picture. The window 38 is no longer necessary and is suitably caused to be removed from view. Concurrently, the window 38 is returned to its default position 36 (FIG. 1).

Although FIG. 2 has been provided as an example, it will be appreciated that other widgets may suitably be implemented. For example, rather than drawing tools, textual tools, input/output control tools, and the like may also be provided. In each instance, the preferred embodiment provides relative motion in the "x" direction by depressing one force sensitive area and relative motion of the window 38 in the "y" direction by depressing the other.

Figure 3:
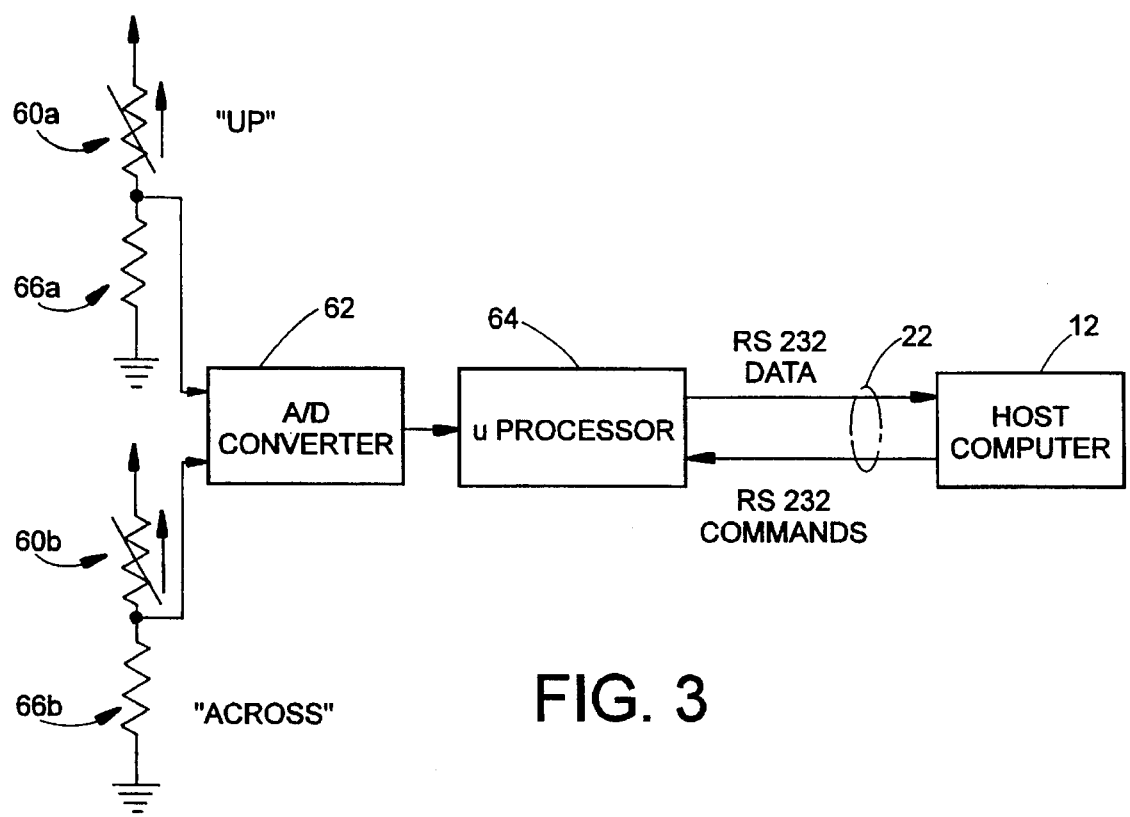
FIG. 3 provides a schematic of hardware to accomplish the subject non-dominant hand interface.

Turning to FIG. 3, a suitable hardware platform for accomplishing the translation from non-dominant hand forces to serial data, suitably picked up by the computer unit 12 described. Force sensitive transducers, comprised of force sensitive resistors ("FSRs") in the preferred embodiment, are illustrated schematically at 60. Included is first transducer 60a for y-direction (e.g. upward) movement control and a second transducer 60b for x-direction (e.g. left-to-right) movement control. The pressure on the force sensitive transducers 60 provides an input to an analog to digital ("A/D") converter 62. A digitized signal resultant therefrom is communicated to processor 64, and its output as serial data. The system of FIG. 3 will be appreciated to have only two transducers. Operator pressure thus moves the window upward or to the right in this embodiment. (Any default position may alternatively be chosen with a corresponding modification of the FSR-induced movement). Thus, this embodiment requires the associated software to return the window to its default position. Also provided are biasing resistors 66a and 66b to define a voltage offset for the A/D converter 62.

Figure 4:
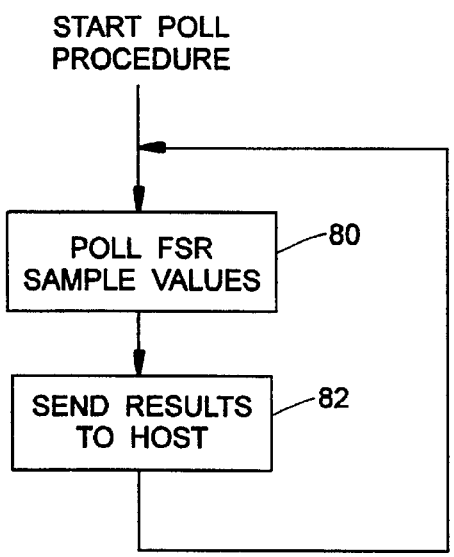
FIG. 4 is a flow chart for software control of the microprocessor 64.

Turning now to FIG. 4, provided is a flow chart of a polling procedure by the microprocessor 64. In block 80, the microprocessor 64 polls values associated with the force sensitive resistors as obtained from the A/D converter 62. Next, at block 82, these values are communicated to the host computer 12 (FIG. 3, FIG. 4), via a link such as the RS232 interface of the preferred embodiment.

Figure 5:
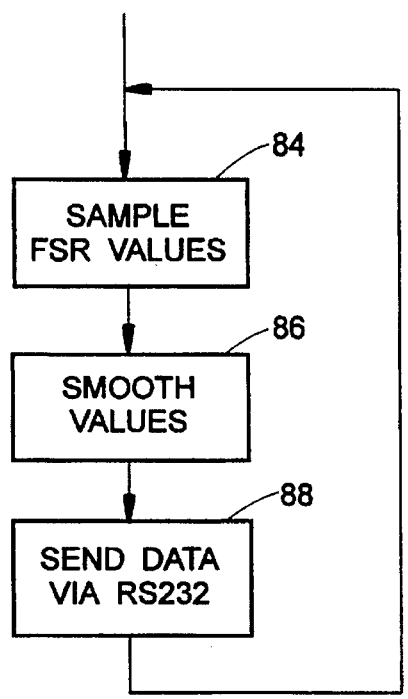
FIG. 5 is a flow chart of a suitable microprocessor flow chart employing value smoothing.

Turning to FIG. 5, a flow chart is provided which also includes a smoothing function. A sampling of FSR values is obtained, similar to that noted in connection with FIG. 5, at block 84. At block 86, the microprocessor implements a smoothing function. At block 88, the resulting, smooth function data is communicated to the host computer via a link, such as an RS232 serial data link.

Figure 6:
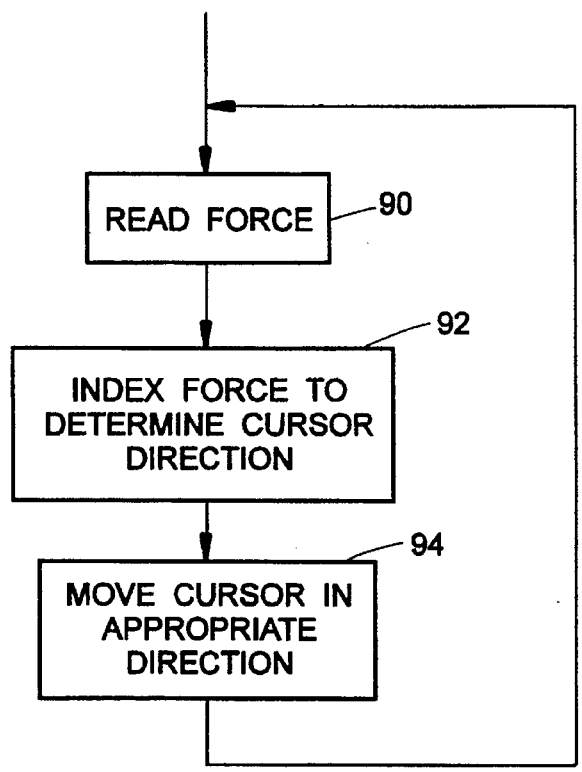
FIG. 6 is a flow chart of software implemented on a host computer to accommodate the hardware of FIG. 3.

In FIG. 6, the flow chart details the activities to be accomplished by the host computer 12. A force value is read at block 90. The value thus read dictates an indexing to determine a cursor direction at block 92. At block 94, an appropriate adjustment in the cursor position is provided.

Figure 7:
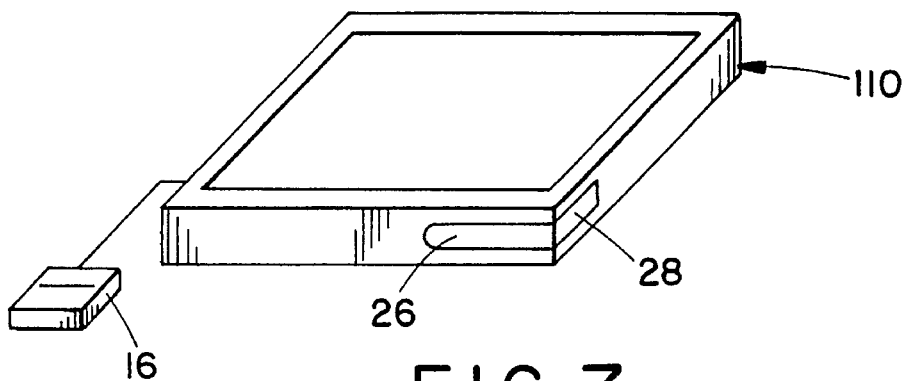
FIG. 7 illustrates an embodiment in which the subject non-dominant hand interface is contained on a computer tablet.

Turning to FIG. 7, an alternative embodiment of the subject transducer is illustrated. It will be appreciated that relative positions of the dominant hand pointer and the non-dominant hand pointer have been reversed for as to those with FIG. 1 for illustrative purposes. In this instance, the force sensitive areas 26 and 28 have been incorporated into a body of a slate-type computer unit 110.

Figure 8:
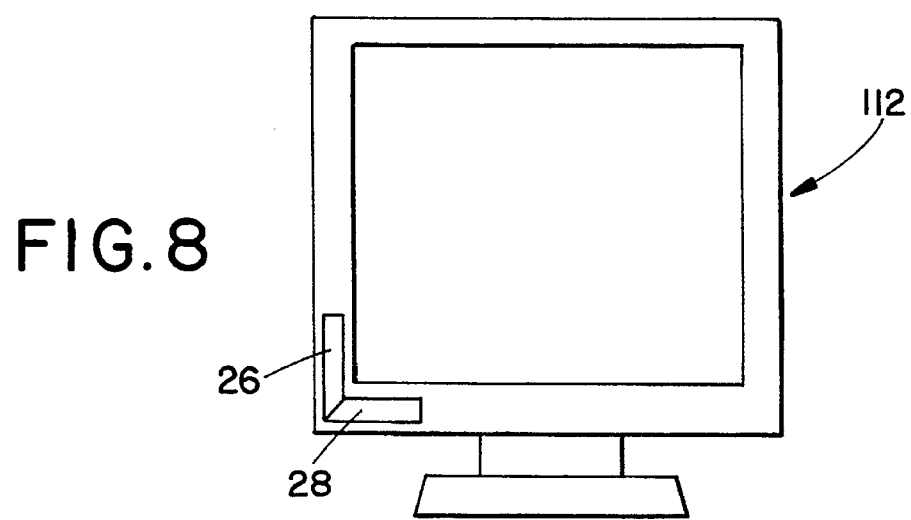
FIG. 8 illustrates an embodiment in which the non-dominant hand interface is integrated onto a video display terminal.
Figure 9:
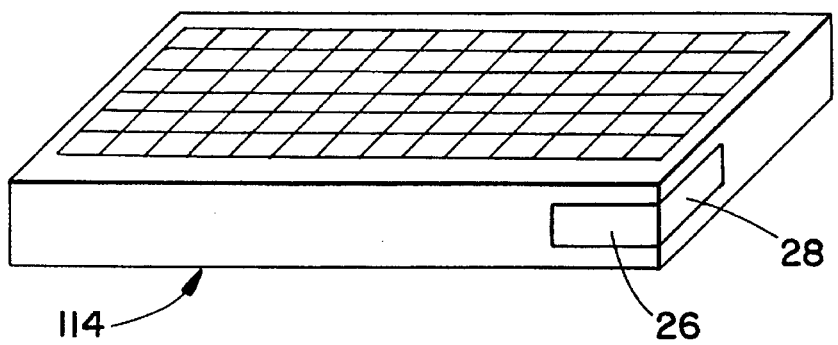
FIG. 9 illustrates an embodiment in which the subject non-dominant hand interface is integrated, into a computer keyboard.

Turning to FIG. 8, an embodiment is demonstrated wherein the force sensitive areas 26 and 28 have been incorporated into the casing of a video display terminal 112. Similarly, FIG. 9 illustrates an embodiment in which the areas 26 and 28 have been incorporated into a keyboard 119. It will be appreciated that a primary pointing device associated with a dominant hand, as well as suitable processor support are associated with these embodiments is described above.

This invention has been described with reference to preferred and alternate embodiments. Obviously, modifications and alterations will occur to others upon a reading and understanding of this specification. It is intended that all such modifications and alterations be included in so far as they come within the scope of the appended claims or the equivalents thereto.

Having thus described the invention, it is now claimed:

1. A computer terminal user interface control comprising:

a first force sensitive transducer having a first force sensitive axis;

a second force sensitive transducer having a second force sensitive axis;

securing means for securing the first and second force sensitive transducers such that the first force sensitive axis and the second force sensitive axis are disposed at an angle relative to one another; and a data processor including,
  means adapted for generating a cursor at a default position on an associated video display terminal,
  means for positioning the cursor at a planar deviation from the default position in accordance with force applied to at least one of the force sensitive transducers, and means for selectively returning the cursor to the default position after force is removed from the force sensitive transducers.

2. The computer terminal user interface of claim 1 wherein the cursor defines a portion of the video display terminal including a plurality of subportions, each of the subportions being adapted to be activated by interacting with a second cursor generated by a second pointer controller.

3. The computer terminal user interface control of claim 2 wherein the securing means further secures the first and second force sensitive transducers such that the first and second force sensitive axes are disposed substantially orthogonally.

4. The computer terminal user interface control of claim 3 wherein:

the data processor is a general purpose digital computer; and the interface control further includes, means for receiving an analog output from each of the force sensitive transducers, means for digitizing the analog output to form a digital transducer signal, means for communicating the digital transducer signal to the data processor.

5. The computer terminal user interface control of claim 4 wherein the securing means is comprised of a module positionable relative to the video display terminal and the data processor.

6. The computer terminal user interface control of claim 4 wherein the securing means is structurally integrated to a housing of the video display terminal.

7. The computer terminal user interface control of claim 4 wherein the securing means is structurally integrated into a housing of the data processor.

8. The computer terminal user interface control of claim 4 wherein the securing means is structurally integrated into a computer keyboard.

9. A two-handed computer terminal user interface control comprising:

a module adapted to be positioned next to a non-dominant hand of an associated operator, the module including, a first force sensitive transducer having a first force sensitive axis, a second force sensitive transducer having a second force sensitive axis, first and second force sensitive transducers secured to the module such that the first force sensitive axis and the second force sensitive axis are disposed at an angle relative to one another, each of the force sensitive transducers generating an analog signal in accordance with force applied thereto, and an analog-to-digital conversion unit receiving analog signals from the force sensitive transducers and generating a digital signal corresponding thereto;

a data processor including, means for receiving the digital signal from the analog-to-digital conversion unit, means adapted for generating a video window at a default position on an associated video display terminal, means for positioning the video window at a planar deviation from the default position in accordance with force applied to at least one of the force sensitive transducers, and means for selectively returning the video window to the default position after force is removed from the force sensitive transducers;

means adapted for communicating digital pointer data received from a pointer positioned next to a dominant hand of the associated operator; and means for receiving operator selection of a subportion of the video window in accordance with a position of the pointer within the video window.

10. The two-handed computer terminal user interface control of claim 9 wherein the first and second force sensitive transducers are secured to the module such that the first and second force sensitive axes are disposed substantially orthogonally to one another.

11. The two-handed computer terminal user interface control of claim 9 wherein the first and second force sensitive transducers are secured to the associated video display terminal such that the first and second force sensitive axes are disposed substantially orthogonally to one another.

12. The two-handed computer terminal user interface control of claim 9 wherein the first and second force sensitive transducers are secured to a housing of the data processor such that the first and second force sensitive axes are disposed substantially orthogonally to one another.

13. The two-handed computer terminal user interface control of claim 9 wherein the first and second force sensitive transducers are secured to a housing of an associated computer keyboard such that the first and second force sensitive axes are disposed substantially orthogonally to one another.

14. A method of two-handed computer user interface control comprising the steps of:

receiving a tactile force from a non-dominant hand of an associated computer operator into a first force sensitive transducer having a first force sensitive axis;

receiving a tactile force from the non-dominant hand of the associated computer operator into a second force sensitive transducer having a second force sensitive axis disposed generally orthogonally to the first force sensitive axis;

generating an analog signaling in accordance with force applied to each of the first and second force sensitive transducers;

generating, via an analog-to-digital conversion unit, digital signaling corresponding to the analog signaling;

receiving the digital signaling from the analog-to-digital conversion unit;

generating a video window at a default position on an associated video display terminal;

positioning the video window at a planar deviation from the default position in accordance with the digital signalling;

selectively returning the video window to the default position after force is removed from the force sensitive transducers;

communicating digital pointer data received from a pointer positioned next to a dominant hand of the associated operator; and receiving operator selection of a subportion of the video window in accordance with a position of the pointer within the video window.

\* \* \* \* \*